Patented Oct. 10, 1933

1,929,443

UNITED STATES PATENT OFFICE 1,929,443

PROCESS FOR OBTAINING ALKALI METAL PHOSPHATES

Charles H. Milligan, Newark, N. J., assignor to The American Agricultural Chemical Company, a corporation of Delaware No Drawing. Application August 26, 1930
Serial No. 477,985

10 Claims. (Cl. 23—107)

My invention is applicable generally to the recovery of alkali metal phosphates from materials containing inorganic phosphates and/or acid phosphates. Suitable materials are; animal bone matter, deposits containing recent or fossil bone matter, mineral deposits containing phosphates of any kind, such as apatite, and artificial materials, such as superphosphates.

The first step in my process consists in treating the raw material with sulfuric acid of a concentration appropriate to replace and liberate the combined phosphoric acid, with the resultant formation of free phosphoric acid. While I may employ any concentration of sulphuric acid which will accomplish this purpose, I find acid of from 25 to 93%, $H_2SO_4$ content, to be effective, and prefer acid of from 50 to 80%, $H_2SO_4$ content, for example 75%. The amount of acid to be applied must be sufficient to form orthophosphoric acid, and for maximum recovery should be sufficient to convert the major part of the combined phosphoric acid to this form. The mixture of acid and raw material is preferably denned to complete the reaction and the mixture of gangue or earthy material carrying soluble reaction products is then extracted by the use of an extraction liquid containing an organic component. To render practicable the subsequent steps of my invention the organic component should be present to the extent of at least 25% of the total, and for best results should predominate in weight. Such an extraction liquid may, for example, consist of ethyl alcohol and water in which the ethyl alcohol is present in excess of 50% by weight of the total.

Many organic compounds are suitable for this purpose, such as for example, alcohols, ethers, glycols, acids, ketones, etc. I do not advocate the use of carbohydrates, hydrocarbons or halogen derivatives thereof. Generally speaking, however, the selected substances should possess the capacity to dissolve orthophosphoric acid, and the oxygenated hydrocarbon liquids appear generally to possess this property. For purposes of this application, I may define liquids to be those substances which are fluid at or near normal temperatures, say below 50° C.

I have obtained superior results from oxygenated hydrocarbon liquids of not exceeding 8 carbon atoms in the chain carrying the oxygen group, preferably from 3 to 8, and while I believe as a result of extensive experiments that substantially all of these compounds are suitable to my purpose, inasmuch as the advantage of any particular compound may be easily determined by test, I prefer to specify an organic liquid selected from this group.

Favorable results may be obtained from the use of the alcohols, primary, secondary or tertiary of not exceeding 8 carbon atoms in the chain carrying the hydroxyl group. A liquid solution containing butyl alcohol, preferably consisting predominantly of this material, has been found very effective. The term "butyl alcohol" as herein employed, denotes any of the isomeric butyl alcohols and/or any mixture thereof.

I further find it of advantage to work with not exceeding ten multiples by weight of the extraction liquid for every unit weight of the mixture of unreacted material and sulphuric acid reaction products produced by the interaction of the sulphuric acid with the phosphate bearing material, and preferably employ not exceeding five multiples by weight of the extracting liquid. I have obtained exceptionally favorable results, both as to ease of treatment and purity of the resulting product, by the use of not exceeding two multiples by weight of the extracting liquid in proportion to each unit weight of the mixture to which it is applied.

The sulphuric acid may be mixed with the raw material in any desired type of mixing apparatus, and the extraction liquid may be incorporated with the products of the reaction in any suitable type of mixing apparatus. The extraction liquid may be thereafter separated from the residue of undissolved material by settling and decanting, by filtration, contrifuging or any other suitable procedure. After separation of the extraction liquid, the last traces may be removed by steaming. The undissolved material may be thereafter washed with water for the separation of an additional quantity of phosphoric material of lesser purity.

I have found that where the sulphuric acid applied to the phosphate containing material is theoretically sufficient to combine with the bases present, either free or combined with other acids than sulphuric oxide, the extraction liquid separates a phosphoric acid which is relatively free from materials other than phosphoric acid formed by the action of the sulphuric acid on the raw material, but may contain sulphuric acid which is difficult to eliminate from the extraction liquid. I have further found that by limiting the amount of sulphuric acid so that it is less than theoretically necessary to combine with the bases present, either free or combined with other acids than sulphuric oxide, the extraction liquid may be caused to separate a relatively pure phosphoric acid free from the applied sulphuric acid. Any reduction from the theoretical will prove beneficial, and by a relatively slight reduction the extraction liquid may be caused to extract a phosphoric acid which is either free from sulphuric acid or in which the sulphuric acid is present in amount so small as not to be detectable by the usual analytical methods.

The extent of reduction to be made industrially may be determined by a series of preliminary experiments in which the sulphuric acid is reduced below the theoretical in successive increments until the desired freedom of the extracted phosphoric acid from the applied inorganic acid is obtained.

In order to produce a satisfactory yield of phosphoric acid, the sulphuric acid should be applied in amount approaching the theoretical. The formation of phosphoric acid from a raw material containing neutral phosphates, for example, may be assisted by the addition of sulphuric acid sufficient to combine even with relatively weak bases which are simultaneously present. The mixture is preferably denned at a temperature in excess of 75° C., for a period of several hours, to permit the reaction to proceed, and during this stage volatile acids may be generated and thrown off by the action of the sulphuric acid on salts of volatile acids which are present in the raw material. For these reasons the amount of sulphuric acid applied should approach that theoretically necessary to combine with the bases present, either free or combined with other acids than sulphuric oxide. The exact reduction from the theoretical necessary to yield a phosphoric acid of the desired purity may be determined by a series of preliminary tests in which various amounts of sulphuric acid less than the theoretical are mixed with test batches of the raw material. Such batches should be held at a temperature of at least 75° C. for several hours, and are preferably held at about 100° C. for about twelve hours or more, and thereafter extracted with an extraction liquid of the type hereinbefore described. By analytical tests applied to the material so extracted, it may be easily determined when the desired freedom from sulphuric acid has been achieved, and the same relative proportion of sulphuric acid may then be applied industrially with the consequent recovery of phosphoric acid of corresponding relative purity.

The phosphoric acid may be separated from the extraction liquid by converting it to an alkali metal phosphate. The term "phosphate" as hereinafter employed, shall denote both the acid and neutral salts. This conversion may be brought about by adding to the extraction liquid the desired base in combination with a weak organic acid, which acid is soluble in the extraction liquid, for example sodium acetate, or alternatively by the direct addition of a base of the phosphate to be produced, such as the carbonate or hydroxide thereof. For my purpose any alkali metal salt, ncluding the hydroxide, may be used, whose negative ion yields an acid with an electrolytic dissociation constant not greater than the dissociation constant of the secondary hydrogen in phosphoric acid. I include herein the di-alkali metal phosphates, such as di-sodium phosphate, which may be employed within the purview of my invention for the purpose of converting the dissolved phosphoric acid to the mono alkali metal phosphates. This class of compounds will be generically referred to in the description and claims as basic salts. The preferred salt is sodium carbonate. The neutralization is ordinarily carried out only to the point of making the mono or di basic alkali metal phophate, which is soluble in the extraction liquid, to a lesser extent than phosphoric acid and will therefore precipitate from solution. This may be accomplished, for example, by adding sodium carbonate or hydroxide to the extraction liquid in the required amounts.

The separation of the alkali metal acid phosphate so produced may be carried out at any suitable temperature, but is preferably carried out at a temperature above the melting point of the phosphate thereby produced. When making mono sodium phosphate for example, this separation would be preferably accomplished at a temperature in excess of 50° C. By so controlling the temperature the phosphate may be separated as a liquid, thereby eliminating the difficulties incidental to the separation of finely divided salts from a liquid and effecting a more complete separation.

While the foregoing separation may be achieved by the use of an extration liquid which is water soluble, as, for example, an extraction liquid consisting predominantly of alcohols of not exceeding 3 carbon atoms, the efficiency of separation and the purity of the resulting product are enhanced by the use of an extraction liquid which is not water miscible. I may, for the purposes of this application, define a water immiscible liquid to be one which is not soluble in water or aqueous solutions of phosphoric acid in excess of 10% by weight of the total, although a solubility under 2% is desirable. A converse tendency of water to dissolve in the extraction liquid is not ordinarily detrimental, provided the extraction liquid does not thereby acquire water solubility in excess of the limit hereinabove mentioned.

Such a water immiscible extraction liquid may consist of a single organic substance which is water immiscible and is alone a solvent for orthophosphoric acid, or may be made up predominantly of substances, which are of this character, with minor proportions of other substances where the mixture so produced is water immiscible and is a solvent for orthophosphoric acid. The other substances present may either be water miscible or water immiscible, and in the latter case alone be incapable of dissolving orthophosphoric acid. Certain water immiscible substances, such as, for example, hydrocarbons, either aromatic or aliphatic, and/or their derivatitves, may be added where the proportion is not so great as to seriously diminish the capacity of the solution to dissolve orthophosphoric acid. It may also be possible to so combine a water miscible organic substance, which is a solvent for orthophosphoric acid, with a water immiscible organic substance, which is not a solvent for orthophosphoric acid, as to produce an extraction liquid which is water immiscible and possesses the required capacity to dissolve orthophosphoric acid.

The water immiscible extraction liquid may be made up by selecting and/or combining organic compounds which are individually water immiscible and dissolve orthophosphoric acid. The oxygenated hydrocarbon liquids, particularly those of lower molecular weight, appear generally to possess this property, but inasmuch as it is impossible to examine each and every of the oxygenated hydrocarbon liquids, I prefer to specify a substance or substances selected from the water immiscible oxygenated hydrocarbon liquids. For the purposes of this application, I may define liquids to comprehend those substances which are fluid at or near normal temperatures, viz, below 50° C. Within this class, I prefer the water immiscible oxygenated hydrocarbon liquids of not exceeding 8 carbon atoms in the chain carrying the oxygen group. I have successfully employed ketones, acids, aldehydes, ethers, aliphatic and aromatic alcohols of this type. In particular I prefer the water immiscible aliphatic alcohols of not exceeding 8 carbon atoms to the molecule, and within this group I find amyl alcohol to be exceptionally efficient. For the purposes of this application, I may define amyl alcohol to denote any of the pure amyl alcohols and/or any mixture of the isomeric amyl alcohols.

The foregoing description is for purposes of illustration and not of limitation, and it is therefore my intention that the invention be limited only by the appended claims or their equivalents in which I have endeavored to claim broadly all inherent novelty.

I claim:

1. Process of obtaining alkali metal phosphates from materials containing inorganic phosphates, which comprises admixing a phosphate containing material with sulphuric acid of from 25 to 93%, $H_2SO_4$ content, in quantity sufficient to form orthophosphoric acid, thereafter contacting the admixed materials with an extraction liquid consisting predominantly of a substance or substances selected from the water immiscible oxygenated hydrocarbon liquid of not exceeding 8 carbon atoms in the chain carrying the oxygen group, which extraction liquid is water immiscible and is a solvent for orthophosphoric acid, thereafter separating said extraction liquid and dissolved phosphoric acid from undissolved material, and removing the dissolved phosphoric acid from said extraction liquid by adding an alkali metal basic salt, thereby converting said dissolved phosphoric acid to the corresponding alkali metal phosphate.

2. Process according to claim 1, in which the alkali metal phosphate produced is a sodium phosphate.

3. Process according to claim 1, in which the alkali metal phosphate produced is an alkali metal acid phosphate.

4. Process according to claim 1, in which the acid alkali metal phosphate produced is a sodium phosphate.

5. Process according to claim 1, in which the alkali metal acid phosphate is separated from said extraction liquid at a temperature not less than the minimum temperature above which the hydrated alkali metal acid phosphate thereby produced is liquid.

6. Process of obtaining alkali metal phosphates from materials containing inorganic phosphates, which comprises admixing a phosphate containing material with sulphuric acid of from 25 to 93%, $H_2SO_4$ content, in quantity sufficient to form orthophosphoric acid, but less than the quantity of sulphuric acid required to combine with the bases present in the material, either free or combined with other acids than sulphuric oxide, thereafter contacting the admixed materials with an extraction liquid consisting predominantly of a substance or substances selected from the water immiscible oxygenated hydrocarbon liquids of not exceeding 8 carbon atoms in the chain carrying the oxygen group, which extraction liquid is water immiscible and is a solvent for orthophosphoric acid, thereafter separating said extraction liquid and dissolved phosphoric acid from undissolved material, and removing the dissolved phosphoric acid from said extraction liquid by adding an alkali metal basic salt, thereby converting said dissolved phosphoric acid to the corresponding alkali metal phosphate.

7. Process according to claim 6, in which the alkali metal phosphate produced is a sodium phosphate.

8. Process according to claim 6, in which the alkali metal phosphate produced is an alkali metal acid phosphate.

9. Process according to claim 6, in which the acid alkali metal phosphate produced is a sodium phosphate.

10. Process according to claim 6, in which the alkali metal acid phosphate is separated from said extraction liquid at a temperature not less than the minimum temperature above which the hydrated alkali metal acid phosphate thereby produced is liquid.

CHARLES H. MILLIGAN.